Oct. 12, 1954 W. R. SAKS 2,691,611
PROCESS OF PRODUCING FLOCKED ARTICLES
Filed April 10, 1952 2 Sheets-Sheet 1

Walter R. Saks
INVENTOR.

Patented Oct. 12, 1954

2,691,611

UNITED STATES PATENT OFFICE 2,691,611

PROCESS OF PRODUCING FLOCKED ARTICLES

Walter R. Saks, Forest Hills, N. Y.

Application April 10, 1952, Serial No. 281,492

22 Claims. (Cl. 154—77)

This invention is a continuation-in-part of my earlier application Serial No. 185,799, filed September 20, 1950, now U. S. Patent No. 2,592,602, and relating to a Process for Producing Flocked Articles. The above named co-pending application disclosed a process which was an improvement of another process disclosed in my earlier application Serial No. 83,898, now Patent No. 2,527,501, for making double flocked articles having inner and outer layers of flock solely separated by an adhesive.

The modifications disclosed included the manufacturing of an article in which opposite ends of the same fibers were protruding on opposite sides of the article. The process was carried out by spraying flock on a charged mold form through an electrostatic field and, while the fibers are held on the mold, depositing a layer of adhesive on the free ends of the flock fibers until a solid layer of adhesive is formed, and spraying thereafter the solid layer of adhesive with flock on the side which is opposed to the side facing the mold. With this process the body of the flocked object was formed by the adhesive, deposited on and between the fibers standing out from the mold, and the piles on both sides of the body were formed by the fibers on which the adhesive was deposited on one side and by those fibers which were deposited on the adhesive on the other side.

In the above mentioned co-pending earlier application an improved process was described using two adhesives, one adhesive being a primary adhesive, first deposited on the mold which receives a first layer of flock fibers which are embedded in said primary adhesive; on and between these fibers a secondary adhesive is deposited, covering the fibers which were first deposited completely, and which is therefore in contact with the primary adhesive. On the surface of said secondary adhesive opposed to the surface in contact with the primary adhesive, a second pile of flock fibers were deposited and embedded into the adhesive. The primary adhesive was then removed so that the secondary adhesive formed the body of the article or object from which the embedded fibers were now protruding on both sides.

A modification of this process was also described in the said co-pending application, by means of which an article could be manufactured in which the fibers penetrated the secondary adhesive completely, standing out on both sides of the secondary adhesive which forms the body of the object. The initial stages of this process of manufacturing an article, in which the same length of fibers are standing out on both sides, were the same as those used for the other modifications of the process and merely fibers of a suitable length had to be used for producing this article. However, after the fibers of the secondary adhesive had been covered completely by the secondary adhesive, an outer layer of this secondary adhesive, covering the fibers on the side opposite to that in contact with the primary adhesive, was removed while the article was still on the mold. After curing of the secondary adhesive and stripping of the article from the mold form, the primary adhesive was removed.

It has now been found in the course of experiments made that by suitably adapting the materials used to the process steps involved and also by somewhat modifying the process steps in accordance with the materials, or in accordance with the desired products, not only a material simplification of the process and a reduction of the number of process steps may be obtained, but the nature of the product thus obtained may be varied over a range, which is wider than the range which has been described in the said co-pending application, so that products with special properties which are well adapted for a number of special purposes may be obtained.

The primary object of the invention thus consists in an improvement of the last named modification of the process described in my earlier co-pending application, by means of which articles are produced in which the fibers penetrate the adhesive, and the piles on both sides of the article are formed by the two ends of one and the same length of fibers, the middle portion of the said fibers being embedded within the secondary adhesive.

A further principal object of the invention consists in the application of the improved technique, applied in connection with this process also to other modifications of the process described.

The above mentioned improvement of the process according to the present invention essentially consists in so depositing the secondary adhesive that the free ends of the fibers, on the side on which the secondary adhesive is deposited, remain exposed, so that the step of removing a predetermined thickness of the secondary adhesive after deposition, in order to free the ends of the fibers, can be dispensed with.

The above described general object may be obtained in different ways. However, the basic steps of the process of depositing a primary adhesive on the mold, of depositing flock fibers electrostatically so that their ends become embedded in the primary adhesive, and the final steps of treating the secondary adhesive, for instance by curing or drying, of stripping the article from the mold and of removing the primary adhesive, are practically or essentially the same in all the modifications of the process according to the invention. The improvement therefore mainly, but not exclusively, resides in the process step of preparing and depositing the secondary adhesive and of treating the same, after deposition, but the specific manner of carrying out this step or these steps also entails in some cases a corresponding change, such as a special adaptation or timing of the flock deposition of the primary adhesive or of the embedding of the flock in the primary adhesive. Likewise the step following the deposition of the secondary adhesive has in some cases to be modified.

The different and more specific manners in which the general object of the invention may be carried into effect may be summarized by the following statement.

It is a first specific object of the invention to regulate the fiber density on a given area and the deposition of the secondary adhesive in such a manner that the fibers are only covered to a certain predetermined extent, leaving the ends of all fibers on the side opposite to that of the primary adhesive exposed and free.

It is a further specific object of the invention to so regulate the fiber density and the deposition of the secondary adhesive that some of the fibers are left free and exposed, while others are embedded and covered in the secondary adhesive. An article produced in this way will obviously differ from an article obtained by a process carried out in conformity with the process described in the preceding paragraph.

It is a further specific object of the invention to produce a layer of secondary adhesive of appropriate thickness by initiating a contraction of the originally deposited layer of secondary adhesive. The secondary adhesive may originally cover the fibers, which are forced to protrude by the contraction of the secondary adhesive layer.

It is a further object of the invention to deposit a layer of secondary adhesive on the primary adhesive before the electrostatic flocking of the primary adhesive with fibers and to deposit flock fibers electrostatically with such driving force that they pierce the secondary adhesive and partly embed themselves in the primary adhesive.

Still further and more specific objects of the invention consist in carrying out the process or processes as above outlined by using different deposition methods for the secondary adhesive.

Still more specifically, it is an object of the invention to so modify the above named processes that they may be carried out in connection with an electrostatic spraying of the secondary adhesive, in connection with a spraying of the secondary adhesive under pressure without the use of an electrostatic field, and in connection with the deposition of the secondary adhesive by dipping the mold into the adhesive.

Still further specific objects of the invention will be apparent from the following specification which refers to the accompanying drawing illustrating diagrammatically the various phases of the process. The drawings are purely diagrammatical and are intended merely to illustrate the principles of the invention as far as they can be graphically illustrated. It is however to be understood that the drawings do not and cannot illustrate all the various modifications which have been described in the specification or which may be designed in order to carry out the principles of the invention. The drawing therefore is merely an aid furthering better understanding of the description but is not to be considered as a survey of the methods or processes by means of which the principles of the invention may be carried into effect.

As already described in my co-pending earlier application Serial No. 185,799 (now Patent No. 2,592,602), and in earlier Patent No. 2,527,501 an electrostatic field is produced within a housing or chamber, and a mold form of any desired configuration, shape or dimension is arranged within this field forming one of the electrodes of the same which may be movable and rotatable on a suitable conveyor through the electrostatic field.

The first stage of the process carried out with an equipment described in my earlier patent comprises the deposition of a primary adhesive 10 on the mold form 12 in a layer or film of predetermined thickness. The deposition of said layer can be accomplished in several ways for instance by spraying the primary adhesive in the electrostatic field, as the mold form moves within the same. The deposition of the primary adhesive can also be effected by dipping the mold form in the primary adhesive or by spraying the mold form with the adhesive. The nature of the primary adhesive and the manner of removing the same has been fully described on page 19 and ff. of my aforementioned co-pending application, which description is applicable to the process hereinafter described.

Figure 4:
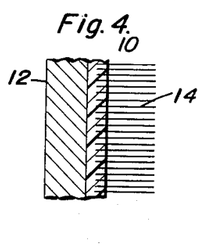
Figure 5:
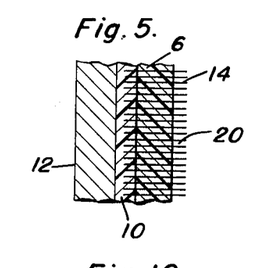

The next stage in the process is the electrostatic deposition of the flock fibers 14 (Figure 4) on the primary adhesive. The fibers must be embedded in the primary adhesive and must be properly oriented preferably in such a manner that they are perpendicular to the layer of the primary adhesive, but any other preferred inclination may be given by suitably positioning the surface in which the fibers are embedded with respect to the electrostatic field. Flock fibers may be deposited in the electrostatic field by means of spray guns which are directed toward the mold form or they may be deposited by gravity from an overhead hopper. A layer of the secondary adhesive 6 is now deposited on the fibers (Figure 5) in such a manner that the secondary adhesive penetrates into the spaces between the fibers and comes into contact with the primary adhesive, but does not completely cover or embed the fibers, and permits a predetermined length of the fibers, as shown at 20, to protrude from the face of the secondary adhesive which is opposite to the face which is in contact with the primary adhesive. Deposition of the secondary adhesive may be accomplished by electrostatically spraying from a direction which is preferably transverse with respect to the longitudinal axis of the fibers, by non-electrostatic spraying at an angle, preferably at right angles to the longitudinal axis of the fibers or by a process of dipping. The secondary adhesive is then cured by heat or drying, the mold form is removed and the article is stripped therefrom and the primary adhesive 10 is removed from the fibers and from the secondary adhesive either by mechanical stripping or by a solvent action, as described by the aforecited earlier application. This results in the article shown in Figure 6 of the drawing which consists of a layer of adhesive from which protrude on the inner and on the outer surface the ends of a single length of fibers which pierce the secondary adhesive and which have been originally deposited on the primary adhesive.

An article manufactured by means of the above outlined improved process has great advantages. One of the main advantages from the standpoint of manufacturing the article is that it can be manufactured by using a single flocking operation instead of two flocking operations which are necessary to manufacture most of the articles described in my co-pending application. Further an article so produced is of much greater strength as its body is reinforced by the fibers piercing the secondary adhesive forming this body. The adhesion of the fibers to the adhesive is moreover improved because of the greater length of the fibers which is embedded in the adhesive. Further, the character of the pile is improved because of the improved ratio between embedded and projecting portion of the fibers.

One of the main advantages of the article however is its "porosity" which the article acquires, even if a completely impervious adhesive medium is used. Moisture, air, water, liquid or gases etc. may now penetrate from one side to the other side by means of the fibers themselves without perforation of the adhesive and without special breathing holes. This advantage enlarges the range of application of this article considerably.

A further advantage which is obtained by the improved process consists in the fact that a much better bond between the fibers and the adhesive is produced when part of the secondary adhesive need not be removed by a solvent. When a solvent is used it is unavoidable that the solvent also weakens the bond between the fibers and the adhesive as the zone of penetration is always much deeper than the zone in which removal takes place.

In order to explain more fully the improvement which has been introduced it has to be emphasized that, while it seems at first sight to be a rather obvious process to limit the thickness of the layer or film of the secondary adhesive to such an extent that the fibers are only partially covered and that the ends of the fibers are left uncovered, this process in fact involves the solution of a number of problems. An average adhesive which is sprayed on the fibers or which is applied by dipping does not merely penetrate between the fibers, but also covers the fibers. In fact, the process described in the earlier Patent No. 2,527,501 according to which the adhesive layer is built upon the fiber ends is directly based on this circumstance. In order therefore to be able to build up a layer of adhesive between the fibers not covering the fibers completely, it is necessary to so embed the fibers that the spaces between them permit and facilitate penetration of the particles of the secondary adhesive and to use as a secondary adhesive a material which essentially is deposited only between the fibers.

Both problems are essentially problems of selection and regulation. The usual regulatory methods cannot be used and special methods have been developed.

In order to regulate the flock density, the distances between the fibers, their even distribution over areas to be flocked, and the desirable orientation of fibers relatively to the covered surface, a plurality or all of the following factors, must be considered:

Length, denier and kind of fibers used,
Amount and method of deposition of flock and control of same,
Positions and areas of electrodes,
Number and types of electrodes,
Distance between electrodes,
Electrostatic potential to be applied,
Speed of passage through electrostatic field, relative to area of field.

A regulation of all of these factors is desirable. It is necessary to regulate these factors for the following reasons.

Obviously, an increase of the voltage gradient of the electrostatic field produces for a given adhesive higher penetration and a lower density of the fibers. The lower density is due to the electrostatic forces produced between the fibers which will increase with increasing voltage gradient. The fibers which are exposed to the electrostatic field all have an induced charge of the same polarity and therefore will repel each other. With a certain minimum quantity of fibers in the electrostatic field the position of each fiber is therefore positively determined by the electrostatic forces producing repulsion of the surrounding fibers and the relation between the distance of the fibers from each other and the charge of the fibers is therefore governed by Coulomb's law and depends on the intensity of the electrostatic field produced and on the voltage used. It will be clear that on account of the above named circumstances the distribution will be even and uniform. The voltage gradient in the electrostatic field is itself dependent on the length and on the denier of the fibers as obviously a greater energy is required for the transportation of a higher weight and for supplying the fibers with sufficient energy for a given penetration into a given adhesive.

In order to obtain the highest densities of flock it is necessary to use short flock fibers of the finest denier (for instance 1.5 to 3 denier fibers of .010 to .030 in. in length) to keep the electrodes as close as possible, thus making use of the lowest voltage possible to activate the flock, and thereby reducing the intensity of the repelling charge induced in each fiber. Under most favorable circumstances an estimated number of 300,000 to 500,000 fibers can be deposited per square inch.

If longer fibers are used the voltage used for propelling and embedding of the fibers into proper orientation must be higher, thereby automatically increasing the distance between the fibers and decreasing the density of the deposition.

Under given conditions there is a maximum density or maximum number of fibers which can be electrostatically deposited in a given area with a desired orientation. An increase beyond this number no longer increases flock density as the fibers are deposited on top of the oriented fibers forming the pile.

According to the invention the regulation of the flock density adapted to a given suitably formulated adhesive is obtained by determining the maximum number of fibers the area will hold under the most favorable conditions for the given length and the given denier of the fibers used and by then introducing an amount of flock which is insufficient to produce the maximum density. Alternatively or concurrently therewith, the following factors may be controlled and changed as desired to produce the desired results: area of electrostatic field, length of electrostatic field, area of hopper openings for flock, speed of passage of the mold form through field, change of voltage gradient, repositioning of electrodes with regard to distance, kind, area and size; all of these factors vary the coulomb forces active between the fibers and help to create a positive control of the number of fibers deposited in any given area and the relative distance between them.

In all cases the uniform and even distribution of fibers, which is determined by the electrostatic forces, remains unimpaired while the distance between the fibers is increased to the amount necessary to facilitate the penetration of the second adhesive between the fibers. The operator is thus in a position to produce those conditions which are necessary for the manufacturing of a desired article, always maintaining the maximum density of the flock compatible with the desired effect or any specific density that may be desirable for other reasons.

As has been explained above the position of a film or layer of secondary adhesive between the fibers is contingent upon a distribution and spacing of the fibers permitting penetration of the adhesive. Obviously this spacing is dependent on the size of the particles of the adhesive. This size is determined by the formulation of the adhesive and it will be readily understood that this formulation must differ from the one described in my earlier Patent No. 2,527,501.

While in all respects not specifically mentioned the description of the materials used for the process described in my co-pending application and in the earlier patent above cited will apply, the formulation of the secondary adhesive in the present case must differ from the one which was described in the earlier patent. The process described in the said earlier patent depends on a depositing of the adhesive on the fibers with a limited penetration of the adhesive only between the fibers. The bulk of the adhesive is built up into a layer on the ends of the fibers.

The quantity of an adhesive which enters between the fibers will, among other factors, be dependent on the pressure exercised during the deposition of the adhesive. In the process described in the earlier patent the main point was to build up a film or layer of adhesive upon the ends of the fibers. The suspensions and dispersions used preferably contained relatively large and sticky solid particles. It was even found desirable to wet the resin particles used in this earlier process in order to cause them to swell and to be tacky and to make most of them larger than the space between the fibers thus preventing penetration between the fibers.

According to the present invention however substantially all the particles of the adhesive should be deposited between the fibers and no adhesive or as little of the adhesive as possible should be deposited on them. This necessitates a special selection of the adhesive in addition to the aforedescribed enlarging of the distance between the fibers. According to the invention, the adhesives which best fill the above stated requirements will be in the form of a dispersion or of modified dispersions. Examples of these dispersions are: organosols, plastisols, and latices of natural or synthetic materials. However, as will be described hereinafter, the materials which may be used according to this invention are not restricted solely to dispersions.

The term "organosols" has been applied in general to true colloidal sols dispersed in organic media. In particular the vinyl chloride acetate resins are used which form a group of copolymers which are permanently thermoplastic and readily heat sealable. They do not change when aging because the resins are completely saturated compounds. Dispersions of this type are described in detail in a booklet with the title "Vinylite Resins, Dispersion Coatings," copyrighted 1949 by Bakelite Corp. of New York. The resins are not dissolved in solvents, but are dispersed as finely divided particles. As a result high viscosities, characteristic of solutions, are not obtained. The resin content usually lies between 30 and 50% of their weight and the total solids usually ranged between 17% and 85% by weight of plasticized compositions.

The term "plastisols" is applied to dispersions of the same type in which the proportion of plasticizer is high enough to be the sole dispersing medium. Plastisols are made by grinding resins, plasticizers, stabilizers and other materials such as fillers and pigments together. They can be made in a very wide range of viscosities varying from pastes to thin flowing liquids. To convert the organosol or the plastisol into a tough usable film it must be cured by evaporating the volatiles (if any) and fusing the resin particles by heat at a temperature of around 325 to 350° F.

Normally a few seconds at 350° F. will be sufficient to fuse organosols and plastisols into a usable film. However, when volatiles are present heating is slower, depending on the boiling point of the volatiles. Usually thin films are heated to 225° F. for 1 to 5 minutes and then to 350° F. for a few minutes. However as different molds heat up at different rates the application of heat must be determined locally.

Two types of liquid components or thinners are used for making organosols, usually termed dispersants and diluents. Dispersants are polar compounds which form a strong attachment to the resin. Plasticizers and volatile components such as esters, ketones, glycol ethers etc. may be used as dispersants. Diluents are usually aromatic or aliphatic hydrocarbons. They modify the wetting and swelling characteristics of the dispersants. Aromatic hydrocarbons in addition swell the dispersed resin, raising the viscosity and lowering the solid content at which the composition can be prepared. By blending aromatic and aliphatic hydrocarbons the extent of such swelling may be regulated. The viscosity will vary with the ratio of dispersants and diluents. It passes through a minimum at a certain ratio increasing with the change of either component.

For each combination of diluent and dispersant there is a range of compositions in which the resin can be ground to form an organosol. The viscosity, stability, solid contents etc. are controlled by the balance between dispersant and diluent and also by the selection of the diluents and dispersants. It will however be clear that organosols are sufficiently variable according to the way in which they are prepared to provide the regulability which is necessary in connection with the present invention.

The properties of organosols are dependent on the choice of resins, plasticizers, diluents, dispersants, stabilizers, pigments and if desired, fillers, and the relative ratios of each material. In general, for every 100 parts of resin in an organosol, 30 to 70 parts of plasticizer is used, and up to about 30% volatiles.

The properties of a plastisol are likewise dependent on the ratio of the components, and in general, for every 100 parts of resin, 80 to 120 parts of plasticizer is used. Additional ingredients such as fillers, stabilizers, and pigments may also be incorporated.

Thus the plastisol, having in general a higher percentage of plasticizer, will yield a type of film different from the film obtainable by using an organosol, such film being usually softer with a greater degree of stretch and with a reduction in tensile strength.

Plastisol may have volatiles added to them, and these "cut back plastisols" resemble to a certain degree organosols.

To obtain the best deposition of the dispersion between the fibers it is important that the particles be as small as possible and be non-swollen and non-tacky so that they do not stick to the ends of the fibers. As these particles are suspended in plasticizers which act for the most part as lubricants, the particles, if small enough do not stick to fibers such as viscose rayon.

To state an example it may be mentioned that vinyl resin particles for organosols and plastisols usually range between 0.5 and 3.0 microns in size. Assuming that 100,000 fibers are desired to be deposited on a square inch of a surface, and that said fibers are 1/1000 of an inch wide and of any length, about 333 fibers will be deposited, substantially equally spaced, on any given one inch plane of one row of fibers. Considering 333 fibers of 1 mil each deposited and spaced in an area of 1000 mils, it will be clear that sufficient space for the resin and plasticizer particles of the dispersion each about 1 micron in size is left for the passage between the fibers. These particles then become trapped in the labyrinth produced by the action of the fibers and the thixotropic nature of the material itself.

*Examples of formulations.*—The choice of resins is important in obtaining adhesion and desirable film characteristics. The plasticizer choice which is much wider, determines adhesion to fibers, elasticity and softness of film, flexibility, resistance to oils, greases, water, ultra-violet rays, resistance to migration, and a number of other factors. The choice of diluents and dispersants controls viscosity, swelling and tackiness and has some effect on thixotropic qualities.

*Example I*

A standard organosol is used as a base formula, such as "Bakelite Formula XDL5053" consisting of:

| | Parts by weight |
|---|---|
| Vinylite resin VYNV.1 | 45 |
| Flexol plasticizer DOP | 31 |
| Baysol "O" | 20 |
| Diisobutyl ketone | 3 |
| Stabilizer A–5 | 1 |
| | 100 |

Vinylite resin VYNV.1 is a vinyl chloride-vinyl-acetate copolymer resin consisting of about 95% vinyl chloride and 5% vinyl acetate.

Flexol plasticizer DOP is di(2-ethylhexyl)-phthalate (dioctyl phthalate).

Stabilizer A–5 is a lead pigment (basic silicate white lead or basic lead carbonate).

Baysol "O" is a terpene solvent produced by Newport Industries, Inc., and described in their pamphlet entitled "Newport Terpene Solvents" as a terpene solvent having the lowest kauri butanol value. In a pamphlet issued by the same manufacturer and entitled "Newport Products" it is stated that the weight by gallon of Baysol "O" is 6.79, the specific gravity at 50° C. is 0.8150, that its refractive index is 1.4470, its flash point 120° F. and the kauri butanol value is 42.

This organosol is modified to obtain better oil and grease resistance, better resistance to water, migration, and ultra-violet rays, the modified formula is as follows:

| | Parts by weight |
|---|---|
| Vinylite resin VYNV.1 | 45 |
| Flexol plasticizer DOP | 10 |
| Paraplex plasticizer G–50 | 15 |
| Paraplex plasticizer G–60 | 10 |
| Paraplex plasticizer G–25 | 5 |
| Stabilizer A–5 | 1 |
| Solvesso 100 | 13 |
| Diisobutyl ketone | 1 |
| | 100 |

Solvesso 100 is an aromatic hydrocarbon solvent which may be used interchangeably with toluol or xylol.

Paraplex plasticizers are all polyester type resins of polymeric or resinous type.

Paraplex G–25 is a viscous polyester resin specially developed to be a permanent non-migratory plasticized for polyvinyl chloride which becomes an integral part of the resulting composition.

Paraplex G–50 and G–60 are low viscosity polymeric type resins.

It has been found that flock fibers tend to stiffen an adhesive film somewhat; a higher percentage of plasticizer may be used to compensate for flock stiffening.

To the above organosol type adhesives may be added from 5 to 200 parts by weight of a mixture of diluents. Usually 95% diluents, and 5% dispersant are used as a basis, but in some cases 100% diluents may be added. Examples of diluents which may be used by themselves or preferably blended are xylol, toluol and Solvesso 100 and those diluents which are described and the viscosity diagrams of which are illustrated on page 25 of the above cited booklet, Vinylite Resins Dispersion Coatings, May 1949.

Example of dispersants used are diisobutyl ketone or methyl isobutyl ketone.

*Example II*

A standard plastisol formula such as Bakelite VJ1250 may be used which consists of:

| | Parts |
|---|---|
| Vinylite resin VYNV.2 | 50 |
| Flexol plasticizer DOP | 49 |
| Stabilizer A-5 | 1 |
| | 100 |

Vinylite resin VYNV.2 is chemically identical with VYNV.1 but is slightly different with respect to wetting and dispersing properties.

This plastisol may be modified to get the improved plasticizer qualities of the modified organosol above. A suitable modified formula is:

| | Parts |
|---|---|
| Vinylite resin VYNV.2 | 48 |
| Flexol plasticizer DOP | 15 |
| Paraplex plasticizer G-50 | 20 |
| Paraplex plasticizer G-60 | 10 |
| Paraplex plasticizer G-25 | 6 |
| Stabilizer A-5 | 1 |
| | 100 |

To these plastisols 5 to 200 parts of diluent or diluent-dispersant blend may be added to adjust viscosity as desired.

In order to promote and improve adhesion of the same flock fibers to the adhesive film forming medium, and to change the adhesive nature of the film forming material, other natural and synthetic media may be blended with the plastisols and organosols.

These additional media may be in the form of solid particles, such as resins ground in with the dispersion, an example being 100% solids of acrylic resin.

Alternatively, the medium may be added in the form of a solution, such as acrylic resin in solution of 40% solids, in toluol.

A special blend of solvents and/or plasticizers may be used which will soften and etch the fibers, such as acetate rayon.

By using dispersants which are good solvents for resins at higher temperatures, better adhesion may be obtained, an example of such a dispersant being diisobutyl ketone, which acts as solvent for many vinyl resins at higher temperatures only.

The addition of adhesive media to the organosol and plastisol adhesives in some cases improves washfastness of the material, in other cases improves abrasion resistance, and in still further cases, such as with the acryloid solution, may partly coat the ends of the fibers producing a water resistant and waterproof coating on the ends of the fibers opposite the ends embedded in the primary adhesive. Thus a normally wettable fiber becomes water resistant on one side or end, if a sufficient quantity of a solution type adhesive is included in the organosol to coat or impregnate the free ends of the flock fibers.

The application of additional adhesive media is not restricted to the acrylics. Some other types of materials which are compatible with and have been actually blended with the plastisol and organosol formulations include the following resins: phenolics, alkyds, urea formaldehyde and melamine-formaldehyde, acrylonitriles; and rosins.

Dispersions of these materials may also be used to form the adhesive and film forming materials. Equally solutions and solutions and dispersions mixed together may be used.

The way in which latices of natural and synthetic rubber are prepared is well known in the art, and it need only be mentioned that to improve the adhesion of the natural and synthetic rubbers to the fibers used, which greatly depends on the choice of fibers, additional adhesive media may be added. Such a medium may be in the form of a dispersion, for instance, of acrylic particles, which bond the fibers and rubber together during the curing cycle. The adhesive media may also be in the form of a solution, such as casein.

The latices are not restricted to the natural and synthetic rubber field. Water dispersions and emulsions with plasticizers are common, and vinyl latices, styrene latices, acrylic latices, polyvinyl butyral latices, etc. may be used in place of the organosol or plastisol media. Any type of resin, rubber, or natural or synthetic latex may be used and may be combined with any number of compatible materials.

The aforementioned adhesives have important advantages. They can preferably be applied to a porous material such as viscose rayon fibers without the fibers absorbing the solid particles during the period of deposition of the dispersion. Further they have the faculty of being adjustable within a wide range with respect to film forming and other physical properties which play the decisive part in their use as an adhesive. For instance, the adhesion or non-adhesion to different kinds of fibers, such as viscose or acetate rayon, can be regulated by the proper selection of resins, plasticizers and volatiles. The volatiles which are used in connection with these adhesives are relatively inexpensive and especially in connection with latices, no dangerous vapors are encountered.

For all these reasons the above named types of adhesives are preferable to others with many of the processes described. However, in connection with some processes, as will be explained below, the choice of adhesives is much wider.

In the process which has been above described the fibers have first been partly embedded and have been firmly anchored at predetermined distances in the primary adhesive. If the secondary adhesive consists of an organosol which has been prepared following the above outlined indications (the formulation in detail is described in the above named booklet) and the formulation has been such that the resin particles are non-swollen and non-tacky, for instance, by selecting the ratio of diluent and dispersant just above the minimum—which selection has also other advantages not connected with the present invention and relative to the properties of the organosol—it is possible to produce an organosol which is sprayable, is highly atomized when sprayed and which may be sprayed from the customary spraying distance of from 6 to 12 in. under a relatively high pressure of 40 to 100 lbs. The spraying distances and the spraying is best done at an angle of 90° relatively to the fiber axis, as this will cause a minimum of disturbance to the fibers.

The properly formulated and properly sprayed adhesive with a solid content of between 30% to 90%, sprayed under a high pressure (about 40 lbs. and up to 100 lbs.) which is highly atomized permits, as has been found experimentally, to deposit practically all the organosol particles on the surface of the primary adhesive between the fibers so that the fibers project solely from the organosol film.

When using standard organosols cut back to 50% to 80% solid content and sprayed at air pressures from 30 to 60 lbs. with finely atomized organosols it was found that a small number of fibers had been knocked over and that minute traces of the adhesive were left on the surface of the fibers which were protruding from the adhesive. The traces of the adhesive on the projecting fibers could however be completely removed by spraying a diluent such as toluol at a 45° angle or by brushing the fibers with a fine brush. With the correctly formulated organosol however, it was possible to either avoid completely any deposit on the fibers or to reduce any deposit to such a minimum that the residue could be blown off the tips of the fibers with air pressure or removed by electrostatic forces.

The results of the experiments which were carried out in connection with this process also lead to a further modification of the above described process. As has already been mentioned organosols may be so formulated when they have a somewhat higher solid content than those in the first mentioned process that they knock over a small number of fibers. Experiments have been conducted in order to produce an organosol knocking over fibers to a desired degree. The organosols in such experiments were formulated in the above mentioned manner with a slightly higher solid content. For instance, a standard formulation of organosols such as commonly used for wire dipping was used which was cut back with a non-solvent diluent and/or a plasticizer to a point where it can be sprayed by means of an air spray gun. Spraying the fibers with a pressure of about 30 lbs. it was found that the organosols had formed droplets on the free ends of the fibers covering about 50% of the entire area. Upon fusing the sample, flock fibers were protruding from 50% of the surface while about 50% of the adhesive had penetrated between the fibers and had been deposited on the primary adhesive. This 50% organosol layer still formed a continuous vinyl film holding the fibers together and after removal of the primary adhesive a film was formed with around 50% of the fibers protruding from one side, while all the fibers protruded from the other side from which the primary adhesive had been removed.

These experiments led to the developing of a process modification in which this result was produced to a lesser degree but intentionally. Upon examination of the fibers it was found that the fibers which had been covered by the adhesive did not project from the adhesive carrying a particle of the adhesive, but had been bent over and had been fully or partly buried in the adhesive. Upon curing and fusing the organosol layer, it was found that the bent fibers were immersed within the said layer.

With this process spraying the secondary adhesive under relatively high pressure and spraying in an electrostatic field are particularly useful as the binding of the fibers on which particles are deposited and the embedding of bent fibers ends is promoted and is controllable by such deposition.

Figure 7:
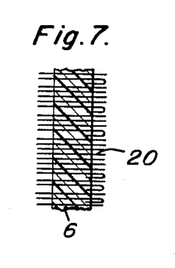
Figure 7 is a diagrammatic cross section through an article produced by a modification of the process according to which the ends of some of the fibers have been bent and are embedded while others remain standing.
Figure 8:
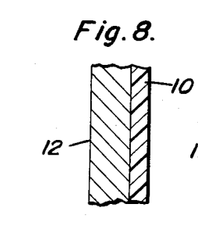
Figures 8, 9, 10, 11 and 12 diagrammatically illustrate cross sections through the mold form and the flock carriers in successive stages of the manufacturing process according to a modification of a process of the general type illustrated in Figure 1.
Figure 9:
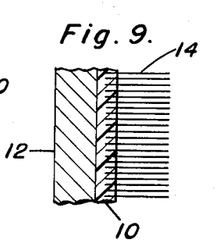
Figures 10, 14:
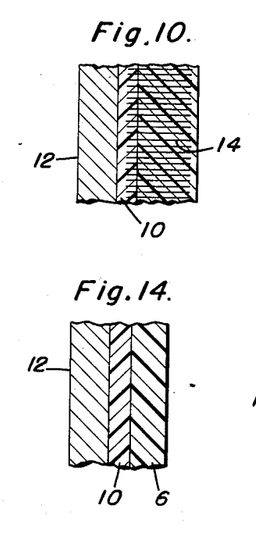
Figures 13, 14, 15 and 16 diagrammatically show cross sections through the mold form and flock carriers in successive stages of a manufacturing process, such as diagrammatically shown in Figure 2.

Accordingly, a process was developed which leads to the manufacture of an article, a section of which is shown in Figure 7 of the drawings. The adhesive was so formulated and the spray pressure was so regulated that a predetermined percentage of fibers is bent over and is buried in the adhesive layer as shown in Figure 7.

The bending over of the fiber is dependent on the length and denier of the flock fibers, practically only fibers above .040 inch have a sufficient length of flock and distance between them to bend over. The selection of the length and denier of the fibers thus plays a major part in determining such bending of the fibers.

It is therefore also possible to regulate the percentage of the bent fibers by using a mixture of flocks, some of which have a length and/or denier which will not favor bending over while others have a length and denier favoring bending. This mixture therefore is a means for influencing the percentage of bent fibers and therefore the character of the surface of the finished article.

This process is otherwise carried out in the manner which has already been described merely the formulation of the adhesive being changed.

Figure 6:
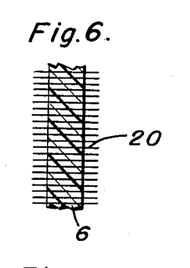

The product as seen from Figure 7 is however a product which is different from the product which has been shown in Figure 6 and which has been produced by the process which was first described. One of the advantages of the product shown in Figure 7 consists in the fact that a very thin organosol film can be used, the thickness being between .002 and .020 in., depending on the length of the fibers, which film is as strong as a much thicker film made by the first mentioned process or by a process according to my co-pending application. This result is due to the reinforcing of the strength of the film by the bent fibers which have one end completely embedded in the film. Further the texture of the two opposing sides of the article is now dissimilar, a circumstance which may be of great advantage for many articles, serving as wearing apparel (such as gloves). The process carried out according to this modification of the invention produces an especially desirable product for many purposes, permitting producing of articles with different densities and different length of pile on opposite sides by a single flocking process. Normally this type of article would be produced by two flocking operations and could not be expected to be the result of a process in which a single flocking process occurs and in which the fibers protrude on both ends of an adhesive forming the body of the articles. Moreover, the film is doubly reinforced by the fibers piercing it as well as by the bent ends of some of the fibers embedded therein. Thus an article of much greater strength of thinner film structure may be produced.

The two aforedescribed modifications of the process producing an article consisting of a film pierced by a single length of fibers which protrude on both ends were described in connection with pressure spraying of the secondary adhesive by means of air pressure which spraying was carried out without an electrostatic field.

The two processes may however both be modified by using electrostatic spraying of the adhesive. It is well known in itself to deposit coating material by electrostatic means, the article to be coated being usually the collecting electrode with other suitably positioned electrodes providing the electrostatic field. The use of electrostatic spraying which has already been described in my earlier co-pending application is to be considered by itself as a known process, but in connection with the above described process it has the special advantage that it improves the deposition of the secondary adhesive between the fibers because of the electrostatic attraction exercised. During electrostatic spraying of the secondary adhesive the mold or molds exercise a pulling force on the particles, thus aiding in making all the particles settle at the closest possible distance from the mold and incorporating all the particles into the layer of adhesive which has been deposited between the fibers.

Thus it is possible to spray the particles into an electrostatic field from any desired angle under relatively low air pressure. The electrostatic field picks up the particles, and places them as the forces in the field dictate. In order to obtain the maximum utilization of the field, to minimize overspray and to use overspray to advantage, it is desirable to spray into the field from an acute angle relatively to the angle of the conveyor. It is thus desirable to spray in a direction transverse to the axis of the fibers and to allow the forces of the electrostatic field to change the direction of the particles so deposited in the electrostatic field and to orient the particles between the fibers as close to the attracting electrode as possible.

The method of electrostatic spraying also reduces the waste of adhesive which is not completely avoided with spray guns using air pressure deposition alone.

The adhesive as formulated in the above described process may also be applied by dipping.

While it would seem that a dipping operation will mainly cover the fibers and will only imperfectly cover the base formed by the primary adhesive from which the fibers protrude, the rather unexpected result of the dipping operation was that there is not much difference between the dipping of a bare mold and the dipping of a mold covered with the primary adhesive carrying the fibers. With the secondary adhesive of the afore mentioned types adjusted for dipping, there was no affinity of the wet adhesive for the fibers, such as viscose rayon. It was also found that the film which was built upon the primary adhesive between relatively long fibers (.040–.055 in.) was very nearly of the same thickness as the film which was formed with the same adhesive under the same circumstances on the bare mold. When using the dipping process it was found that very few fibers were bent by the process when short fibers were used. The number of bent fibers seemed to depend on and to vary with the denier, length, type and spacing of the flock, the length of the flock, the rate of withdrawal of the mold and the thixotropic nature of the adhesive medium. When dipping a mold form, such as a customary type rubber glove dipping form, after said form had previously been coated with a primary adhesive and had been electrostatically flocked, it was found that using a controlled rate of entrance and withdrawal of the mold form, varying between 3 and 6 in. per minute will result in an excellent application using organosol formulations. Using latices, multiple dips were used to obtain similar thicknesses if no coagulants were used in the primary adhesive. A single dipping into an organosol using, for example, 1½ mm. flock of 5.5 denier may result in a film being formed between the ends of the flock fibers and adhering to the center of the fibers of an average thickness of $10/1000$ of an inch. The thickness of the film is accurately controlled by the formulation of the organosol or plastisol. With an organosol a single dipping was made. With latices multiple a dippings were made. With plastisols it may be of advantage to heat the mold form. It was found that by using a dipping operation, the range of usable secondary adhesives is in some respects greater than with any other modification of the process and that adhesives of widely different character might be used.

During the dipping process the mold may be allowed to drip clean of the adhesive. This is especially possible in connection with plastisols, dipped cold, which may not have the thixotropic qualities of an organosol. Thereafter the mold may be rotated to produce an even film deposition so that the fibers are partly and equally covered by the secondary adhesive. If the adhesive has been formulated as above explained, the adhesive will flow freely between the fibers and it then forms a thin film of regular thickness, the thickness being essentially controllable in the way in which it is regulated on the bare mold.

When latices are used in connection with the dipping process it may be advisable to add plasticizers, resins, rosins, or solution adhesive components, such as casein, to get a maximum of adhesion. This is however a minor problem as the fibers are gripped in the middle and over the entire thickness of the film and therefore sufficient adhesion may be secured.

The dipping technique may also be used with adhesive mediums which are of the dispersion type and have incorporated therein solvent type adhesives. Solvent type adhesives may also be used as the sole adhesive. Such adhesives are outlined in my co-pending application, and as an example thereof, a nylon solution in alcohol and water may be used.

Further, other types of solution adhesives may be used, such as the polyvinyl butyral adhesives with thermosetting resins mentioned in the U. S. patent to Haas, No. 2,396,098. Other types of media may comprise vinyl solutions etc.

These adhesives comprising the modified dispersion type adhesives, the solution type adhesives, and other aforementioned types of adhesives may, depending upon the fibers used and the ratio of the materials in the adhesives, form films on, or impregnate the fibers, causing the fibers to become in most cases water resistant and in some cases resistant to dry cleaning solvents. Thus by suitably selecting the adhesive a flocked article with flock fibers piercing the adhesive medium and having opposite ends of the fibers on the opposite sides of the adhesive may be produced one side of which will be water resistant, waterproof, or water repellant, as desired.

A further modification of the process is illustrated diagrammatically in Figures 8 to 11. The process according to this modification is essentially the same as the process already described before up to the state of deposition of the secondary adhesive. The primary adhesive is first applied to the mold and is flocked with fibers whereupon the secondary adhesive is applied. The secondary adhesive in this case is so applied that it covers the fibers completely and therefore this process is, up to this phase, similar to one of the processes described in my co-pending application.

The process according to the invention however differs in the following stage.

Figures 11, 15:
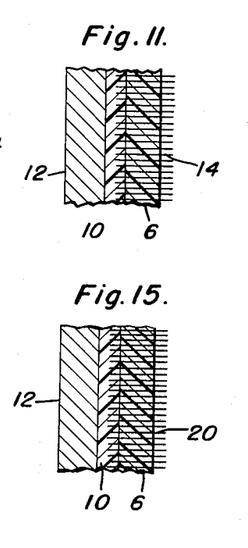
Figure 12:
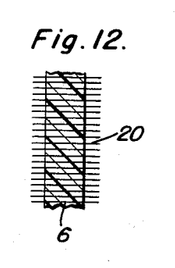
Figure 13:
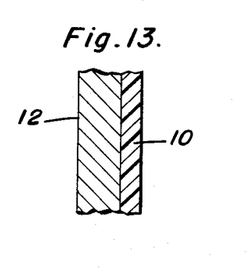
Figure 16:
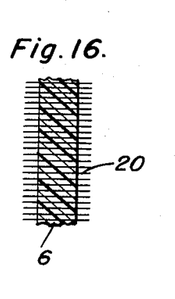

When the secondary adhesive has been applied it is cured or dried and during this curing or drying process the adhesive is shrunk to form a thinner film as the volatile components are evaporated. This phase or stage is shown in Figure 11. The evaporation of the volatile components causes the flock fibers 14 to protrude again from the surface of the secondary adhesive as soon as the film of the adhesive contracts in thickness as will be seen from the aforesaid figure.

To enable a film to contract, the cohesive force of the secondary adhesive must be greater than the adhesive attraction to the fibers as otherwise only an irregular surface would result. This condition is fulfilled by a wide variety of compositions and, in fact, the choice of an adhesive medium, usable with this modification of the process essentially is very wide and is in fact much wider than in other modifications. To fulfill the condition of contraction the content of solids in the dispersion or solution must be low enough to cause the film to contract upon drying or upon being heat treated. The sole further condition is merely that the adhesive must be a film forming material and that, as above stated, the adhesive quality be either non-existent or relatively weak when compared with the cohesive forces during the curing or the heating stage.

A suitable selection of the fiber must accompany the selection of the adhesive. The fiber should not be "wetted out" by the adhesive medium as the adhesive is applied. Natural fibers therefore are not desirable. However synthetic fibers such as the fibers known under the name of nylon, Orlon, Dacron, acrilan, viscose and acetate rayon, dynel, vicara and many other fibers are particuarly suitable because the chosen adhesive may have little affinity for these fibers especially when the adhesive is wet. Moreover as these fibers are straight and have relatively few twists and curls there is less tendency for these fibers to become enmeshed in the adhesive.

An application of this process is found in the waterproofing of one side of the article formed. This application is especially useful in connection with hat bodies or water repellant garments or other molded articles where textile appearance and "feel" is desired. The advantage of this process over normal waterproofing of garments is that the article is molded and made waterproof at the same time.

If the adhesive medium contains some form of solution, for example, or impregnating material, and if the film forming adhesive is itself waterproof, the solution can be so formulated that it coats or impregnates the fibers, thus making the fibers on the ends opposite those embedded in the primary adhesive waterproof.

Another variation may be used in which a water resistant adhesive is used with a water resistant synthetic fiber, such as the vinyl type fibers. Then the whole flocked article is waterproof on both sides.

Figure 1:
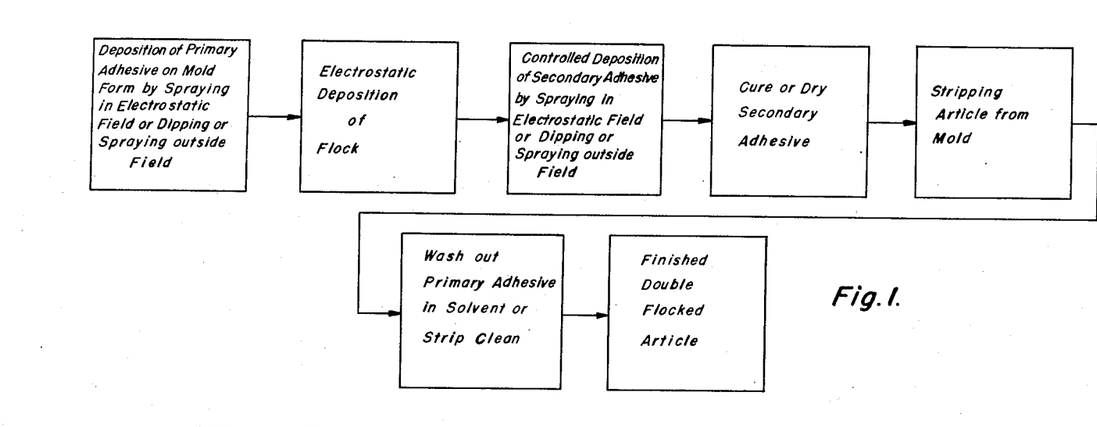
Figure 1 is a block diagram illustrating the sequence of the stages of a process by means of which a double flocked article with a single length of fibers may be made.
Figure 2:
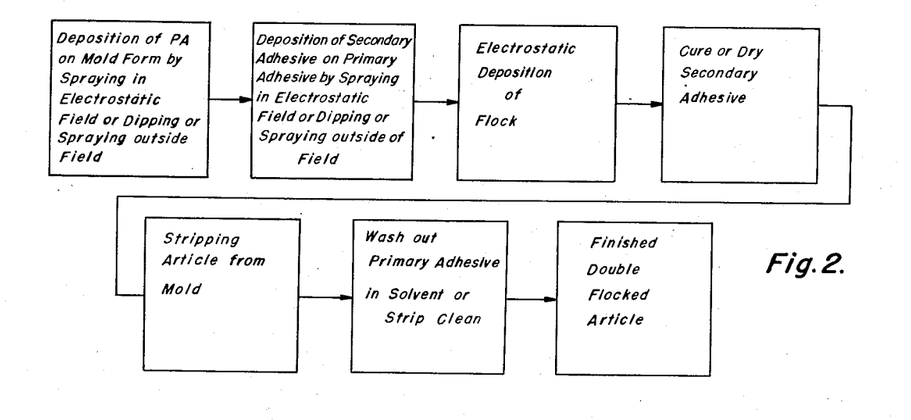
Figure 2 is a block diagram illustrating diagrammatically the stages of a modified process by means of which a double flocked article with a single length of fibers may be made.
Figure 3:
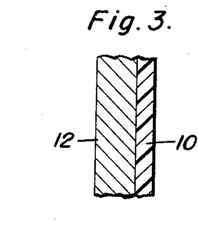
Figures 3, 4, 5 and 6 are diagrams showing cross sections through the mold and the flock carriers, in the successive phases of manufacturing a double flocked article, using the modifications of the process according to the present invention shown in Figure 1.

The stages of a further modification of the process according to the invention are diagrammatically illustrated in Figure 2 and in Figures 12-15.

The process according to this modification starts as before with the deposition of a primary adhesive to the mold form, but the second step in this case is the direct application of the secondary adhesive on the primary adhesive while the latter is still in a wet condition.

While both the primary and the secondary adhesives are still wet the third step which consists in the electrostatic deposition of the flock is carried out. Conditions must be so selected that the flock pierces the secondary adhesive completely and that its ends become embedded in the primary adhesive.

The secondary adhesive in this case will be so selected that a strong film is formed which is very thin so that it can easily be pierced. The formulation of the adhesive, the potential of the electrostatic field and the choice of the flock fibers are to be selected in accordance with the conditions above stated.

Films of a secondary adhesive of a thickness of $2/1000$ to $4/1000$ of an inch consisting of a wet organosol have been deposited by this process and pierced successfully by the flock. The maximum thickness obtainable in the secondary adhesive has not yet been determined as varying formulations produce different results. However, it is clear, that the thickness of many presently merchandised articles may be duplicated with a satisfactory degree of strength.

It was found that this process produces relatively low densities of flock on one side because some of the fibers, probably those which hit a resin particle directly and squarely, do not pierce the secondary adhesive, others pierce the secondary adhesive but do not embed themselves in the primary and still others are bent. The finished article thus somewhat resembles the article the cross section of which is shown in Figure 7. The flock coating in both sides is unequal and a number of fibers are bent back. The bending of the fibers also reinforces the organosol film which in view of the limited thickness of the film which can be used in this case is an advantage.

The fibers which do not embed themselves to a sufficient depth are mostly removed by the electrostatic forces.

While the above mentioned process has only been actually carried out with an organosol film as a secondary adhesive, the process is obviously not limited to this material.

The organosol used was formulated with a relatively high content of solids and relatively low viscosity in order to allow a thinner wet film to be deposited, while the resultant film after drying was relatively thick. Moreover, the flock fibers will pierce in much larger numbers a thin wet and non-viscous film than a thick viscous film. With organosols the solids content may be as high as 99%. The addition of correct diluents and dispersants however changes the viscosity and may greatly reduce it, so that the film can easily be pierced by flock fibers pulled against the mold by electrostatic forces. The particular viscosity which is used cannot be stated on account of its varying character in the same medium, dependent on agitation, rest and other varying factors.

The above outlined further improvements of the process producing an article the body of which consists of the secondary adhesive and of a single length of flock fibers piercing the said adhesive and protruding on both sides show that a great variety of articles may be made by this process having properties which can usually only be obtained by two piles, and many properties which cannot be obtained otherwise, notwithstanding the fact that a single length of fibers and merely a single flocking operation is used and that no additional washing or removing operation is necessary.

It is especially possible to produce articles of this type with unequal pile and to use the balance or difference between the fibers making up the two piles for the strengthening and reinforcing of the film.

This result may be produced by different methods, each method permitting use of a wide range of adhesives and fibers and also a wide range of depositing methods so that by virtue of the improvements a large variety of different articles may be made by the simplified process at lowered costs.

It will be understood that a number of changes and variations may be introduced without in any way affecting the essence of the invention as defined in the annexed claims.

Having described the invention, what is claimed as new is:

1. A process of producing an article with inner and outer piles of flock fibers protruding from an adhesive comprising depositing of a primary adhesive on a mold form, electrostatically embedding one end of flock fibers of a predetermined length in the primary adhesive, depositing a secondary adhesive between the fibers on and in contact with the primary adhesive and building up said deposit between the fibers to a predetermined thickness with the end portion of the fibers protruding from the secondary adhesive being uncovered and exposed, stripping the article from the mold form and removing the primary adhesive to expose the ends of the fibers which have been embedded.

2. A process of producing an article with inner and outer piles of flock fibers protruding from an adhesive comprising, depositing of a primary adhesive, electrostatically depositing flock fibers with their ends embedded in the primary adhesive in an oriented position at a predetermined distance from each other, preparing a secondary adhesive by adjusting its viscosity and solid contents for penetration between the fibers, depositing said secondary adhesive between the fibers on the primary adhesive to a predetermined thickness, the fibers having non-embedded exposed ends, stripping the article from the mold form and removing the primary adhesive to expose those ends of the fibers which have been embedded into the last named adhesive.

3. The process as claimed in claim 2 wherein electrostatic deposition is carried out by means of an electrostatic field and wherein said field is adjusted to produce deposition of the fibers at a distance at which an adhesive, the viscosity and solids of which have been previously adjusted penetrates between the fibers.

4. The process as claimed in claim 2 in which the secondary adhesive is sprayed electrostatically within an electrostatic field to obtain deposition between the fibers.

5. A process of producing an article with inner and outer piles of flock fibers protruding from an adhesive comprising depositing of a primary adhesive on a mold form, electrostatically embedding one end of flock fibers of a predetermined length in the primary adhesive, determining the maximum number of fibers with which a given area may be flocked, and supplying a quantity of flock fibers during deposition which is smaller than the quantity corresponding to the maximum number of fibers, preparing a secondary adhesive by adjusting its viscosity and solid contents for penetration between the fibers, depositing said secondary adhesive between the fibers on the primary adhesive, until predetermined thickness is reached which is smaller than the length of the fibers protruding from the primary adhesive, with the non-embedded ends of the fibers being left exposed, stripping the article from the mold form and removing the primary adhesive to expose also those ends of the fibers which have been first embedded in said primary adhesive.

6. A process as claimed in claim 5 wherein the secondary adhesive is deposited by spraying in a direction at an angle with respect to the axis of the fibers.

7. A process as claimed in claim 6, wherein the secondary adhesive is deposited by spraying in an electrostatic field.

8. A process of producing an article with inner and outer piles of flock fibers protruding from an adhesive comprising, depositing of a primary adhesive, electrostatically depositing flock fibers on and with their ends embedded in the primary adhesive in an oriented position at a predetermined distance from each other, preparing an organosol for use as a secondary adhesive by controlling the ratio of diluents and dispersants so as to produce a viscosity adjusted to the distance between the fibers, depositing said organosol by spraying at a predetermined angle with respect to the axes of the oriented fibers on and in contact with the primary adhesive and building up said deposition by spraying of the secondary adhesive to a predetermined thickness which is smaller than the length of the fibers protruding from the primary adhesive, thus leaving the end portion of the protruding fibers exposed, curing the secondary adhesive while still on the mold, stripping the article from the mold form and removing the primary adhesive to expose the ends of the fibers which had been embedded in the primary adhesive.

9. A process of producing an article with inner and outer piles of flock fibers protruding from an adhesive comprising, depositing a primary adhesive, electrostatically depositing flock fibers with their ends embedded in the primary adhesive in an oriented position at a predetermined distance from each other, preparing a latex for deposition between the fibers as a secondary adhesive of a viscosity adjusted to the distance between the fibers, depositing said latex and building up said deposition by dipping the mold form into a container filled with the prepared latex until a layer of latex forming the secondary adhesive of a predetermined thickness smaller than the length of the fibers protruding from the primary adhesive is formed thus leaving the non-embedded end portions of the fibers exposed, curing the secondary adhesive while still on the mold, stripping the article from the mold form and removing the primary adhesive to expose the ends of the fibers which had been embedded.

10. A process as claimed in claim 9, in which additional adhesive media are incorporated into the latex to improve adhesion to the fibers.

11. A process of producing an article with inner and outer piles of flock fibers protruding from an adhesive comprising, depositing a primary adhesive, electrostatically depositing flock fibers with their ends embedded in the primary adhesive in an oriented position at a predetermined distance from each other, preparing a plastisol by adjusting its viscosity and solid contents so that it penetrates between the fibers, depositing said plastisol between the fibers on the primary adhesive, to a predetermined thickness which is smaller than the length of the fibers protruding from the primary adhesive, with the non-embedded ends of the fibers being left exposed, curing the secondary adhesive while still on the mold, stripping the article from the mold form and removing the primary adhesive to expose the ends of the fibers which had been embedded.

12. A process of producing an article with inner and outer piles of flock fibers protruding from an adhesive comprising, depositing a primary adhesive, electrostatically depositing flock fibers with their ends embedded in the primary adhesive in an oriented position at a predetermined distance from each other, preparing a secondary adhesive by adjusting its viscosity and solid contents for simultaneous penetration between the fibers and deposition on the fibers, depositing said prepared secondary adhesive partly on the fibers and partly between the fibers on the primary adhesive, deposition being continued until deposition between the fibers reaches a predetermined thickness which is smaller than the length of the fibers protruding from the primary adhesive, the non-embedded ends of some of the fibers being left exposed, while the ends of other fibers which have been bent by the adhesive are embedded within the layer of deposited adhesive, curing the secondary adhesive, stripping the article from the mold form and removing the primary adhesive to expose the ends of the fibers which have been embedded, thus producing piles of different density on both sides of the secondary adhesive.

13. A process as claimed in claim 12 wherein the secondary adhesive is deposited by spraying under pressure.

14. A process as claimed in claim 12 wherein the secondary adhesive is deposited by spraying in an electrostatic field.

15. A process as claimed in claim 12 wherein deposits of particles of the secondary adhesive on fibers which have not been bent are removed by air pressure.

16. A process of producing an article with inner and outer piles of flock fibers protruding from an adhesive comprising, depositing a primary adhesive, electrostatically depositing flock fibers with their ends embedded in the primary adhesive in an oriented position at a predetermined distance from each other, preparing a secondary adhesive by adjusting its viscosity and its solids content for penetration between the fibers, dipping the mold form into a container with the prepared secondary adhesive until a layer of secondary adhesive is formed of a thickness which is smaller than the length of the fibers with the non-embedded ends of the fibers left exposed, stripping the article from the mold form and removing the primary adhesive to expose the ends of the fibers which had been embedded.

17. A process as claimed in claim 16 with the added steps of resting the mold after completion of the dipping and rotating the mold to produce an even film deposition.

18. A process of producing an article with inner and outer piles of flock fibers protruding from an adhesive comprising depositing a primary adhesive on a mold form, electrostatically embedding one end of flock fibers of a predetermined length in the primary adhesive, depositing a secondary adhesive between the fibers on and in contact with the primary adhesive, until a thickness of the layer of the secondary adhesive is reached which covers completely the fiber length protruding from the primary adhesive, subjecting said layer of secondary adhesive to a contraction producing treatment while the article is still on the mold form, to expose again the fiber ends so that they protrude from the contracted layer, stripping the article from the mold form and removing the primary adhesive to expose the ends of the fibers which had been embedded.

19. A process as claimed in claim 18, wherein the secondary adhesive is a film forming adhesive with low solids content.

20. A process as claimed in claim 18, wherein the secondary adhesive contains adhesive particles in solution, adjusted to have a high wet affinity and adhering to the flock fibers, producing a coating of the fibers upon dipping to obtain a coating of individual fibers forming a pile on one side.

21. A process as claimed in claim 18, wherein the adhesive is impervious to water thus producing a waterproof article.

22. A process for producing a double flocked article having inner and outer piles of flock fibers protruding from an adhesive, comprising depositing of a primary adhesive on a mold form, depositing, while said primary adhesive is still wet, a secondary adhesive on the primary adhesive, electrostatically flocking the combined layer with fibers of a length exceeding the thickness of the secondary adhesive deposited on the primary adhesive within an electrostatic field so accelerating the fibers that they completely pierce the secondary adhesive and partly embed themselves in the primary adhesive, curing the secondary adhesive while still on the mold, stripping the article from the mold form and removing the primary adhesive to expose the ends of the fibers which had been embedded in the last named adhesive.

References Cited in the file of this patent

UNITED STATES PATENTS

| Number | Name | Date |
| --- | --- | --- |
| 1,887,477 | Slater | Nov. 8, 1932 |
| 2,187,140 | Faris | Jan. 16, 1940 |
| 2,358,204 | Bird | Sept. 12, 1944 |
| 2,527,501 | Saks | Oct. 24, 1950 |
| 2,592,602 | Saks | Apr. 15, 1952 |